(12) United States Patent
Shepherd

(10) Patent No.: US 6,665,962 B2
(45) Date of Patent: Dec. 23, 2003

(54) SHOE WITH LEVEL AND METHOD FOR DETERMINING GRADE

(76) Inventor: Gary Wayne Shepherd, 322 Willow Creek Dr., Folsom, CA (US) 95630

( * ) Notice: Subject to any disclaimer, the term of this patent is extended or adjusted under 35 U.S.C. 154(b) by 0 days.

(21) Appl. No.: 09/852,496

(22) Filed: May 10, 2001

(65) Prior Publication Data

US 2002/0166264 A1 Nov. 14, 2002

(51) Int. Cl.[7] .................................................. A43B 5/00
(52) U.S. Cl. .......................... 36/132; 36/127; 36/136; 36/113; 36/77 R; 473/404; 33/347; 33/370
(58) Field of Search .......................... 36/132, 136, 137, 36/113, 77 R, 127; 33/333, 334, 347, 354, 370, 371, 365, 376; 473/404

(56) References Cited

U.S. PATENT DOCUMENTS

| 5,063,679 A | * | 11/1991 | Schwandt | 33/347 |
| 5,274,927 A | * | 1/1994 | Arnt | 124/88 |
| 5,397,121 A | * | 3/1995 | Gipson et al. | 273/DIG. 30 |
| 5,632,484 A | * | 5/1997 | Lambert | 473/241 |
| 5,755,623 A | * | 5/1998 | Mizenko | 33/384 |
| 5,820,476 A | * | 10/1998 | Amato | 273/DIG. 30 |
| 6,095,933 A | * | 8/2000 | Smith | 33/379 |

* cited by examiner

Primary Examiner—Jila M. Mohandesi
(74) Attorney, Agent, or Firm—Risto A. Rinne, Jr.

(57) ABSTRACT

A level is adapted for attachment to an upper surface of a shoe in such a manner that the level is visible to a wearer of the shoe. The level is calibrated by using a known level surface to stand upon and then adjusting the level so that it reads level when standing on the known level surface. The user then walks intermediate a first and second location, pausing as desired, and noting the reading that is provided by the level. Accordingly, a method of determining the grade at any given location is provided. If the user combines two or more readings that are taken intermediate the first and the second location, an average grade intermediate the first and the second location is provided. A preferred bubble level and method of adjusting the level to the shoe and of detaching it therefrom is disclosed.

1 Claim, 2 Drawing Sheets

SHOE WITH LEVEL AND METHOD FOR DETERMINING GRADE

BACKGROUND OF THE INVENTION

1. Field of the Invention

The present invention, in general relates to shoes and, more particularly, to shoes that include a level to indicate grade.

There are many instances when it is desirable to know if a surface is level or not, and if not, which way does the grade go and to what extent.

Carpenters and building contractors, for example, would like to know if a floor is level. Obviously, if a contractor is to bid on a home repair project, the need to correct an out-of-level floor is pertinent information to know. At present contractors carry levels with them and must place the level periodically on the floor in order to determine if it is level or not.

This, they may forget to do or they may neglect to check the grade, simply because it is not convenient to do so. Accordingly, a quicker an easier way (i.e., method) of determining the grade is needed.

Golfers, in particular, have a pressing and dynamic need to effectively determine the grade when they are attempting to hit a golf ball into a golf hole (also known as a "golf cup" or simply "cup").

The slope of the "green" is an important factor in determining which direction and to what magnitude the ball will "break" after it has been struck. This is well known in the golfing arts.

At present, a golfer typically bends closer toward the surface, usually kneeling behind the golf ball, and attempts to visualize the changes in the slope of the green (i.e., the grade) that occur intermediate the ball and the hole.

The golfer then attempts to mentally average what he "thinks" he sees in order to determine the optimum direction to hit the ball as well as the force that is required.

As this method for determining the slope of the green is based largely on subjective assessments, it is prone to error. Not only amateurs, but professional golfers also suffer from an inability to properly "read" the greens.

Golfers need a way to determine the slope of the green at any given location and also a way that permits them to average the slope intermediate the ball and the hole so that an accurate reading of the grade can be properly factored into any decision regarding the various aspects to consider prior to striking the ball.

Accordingly, there exists today a need for a shoe with level and method for determining grade that can help to solve these long-standing needs.

Clearly, such an apparatus would be a useful and desirable device.

2. Description of Prior Art

Both shoes and levels are, in general, known. While the structural arrangements of the above described devices, at first appearance, may have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a shoe with level and method for determining grade that is inexpensive to manufacture.

It is also an important object of the invention to provide a shoe with level and method for determining grade that is adapted for use with all types of footwear.

Another object of the invention is to provide a shoe with level and method for determining grade that is adapted for use with a golfing shoe.

Still another object of the invention is to provide a shoe with level and method for determining grade that is adjustable with respect to a shoe.

Still yet another object of the invention is to provide a shoe with level and method for determining grade that is detachably-attachable with respect to a shoe.

Still one further object of the invention is to provide a shoe with level and method for determining grade that is adjustable to compensate for uneven wear of the sole of the shoe.

Yet another important object of the invention is to provide a shoe with level and method for determining grade that allows a person to determine the grade at any given location where the person is standing.

Still yet another important object of the invention is to provide a shoe with level and method for determining grade that allows a person to determine the average grade between any two points by walking intermediate the two points, noting the reading provided by a shoe with level at a plurality of points along the way, and averaging the reading.

One continuing object of the invention is to provide a shoe with level and method for determining grade that can be sold as an aftermarket item for use with existing types of shoes.

One further continuing object of the invention is to provide a shoe with level and method for determining grade that can be included with a shoe at the time of manufacture.

Briefly, a shoe with level and method for determining grade that is constructed in accordance with the principles of the present invention has a shoe or other type of footwear that includes a level disposed at a top surface of the shoe. Preferably, a bubble-type of a level is used and it is detachably-attachable with respect to the shoe. One method of attachment includes a hook and loop fastener. The level is adjustable to compensate for the uneven wear of the sole of the shoe.

DETAILED DESCRIPTION OF THE INVENTION

Figure 1:
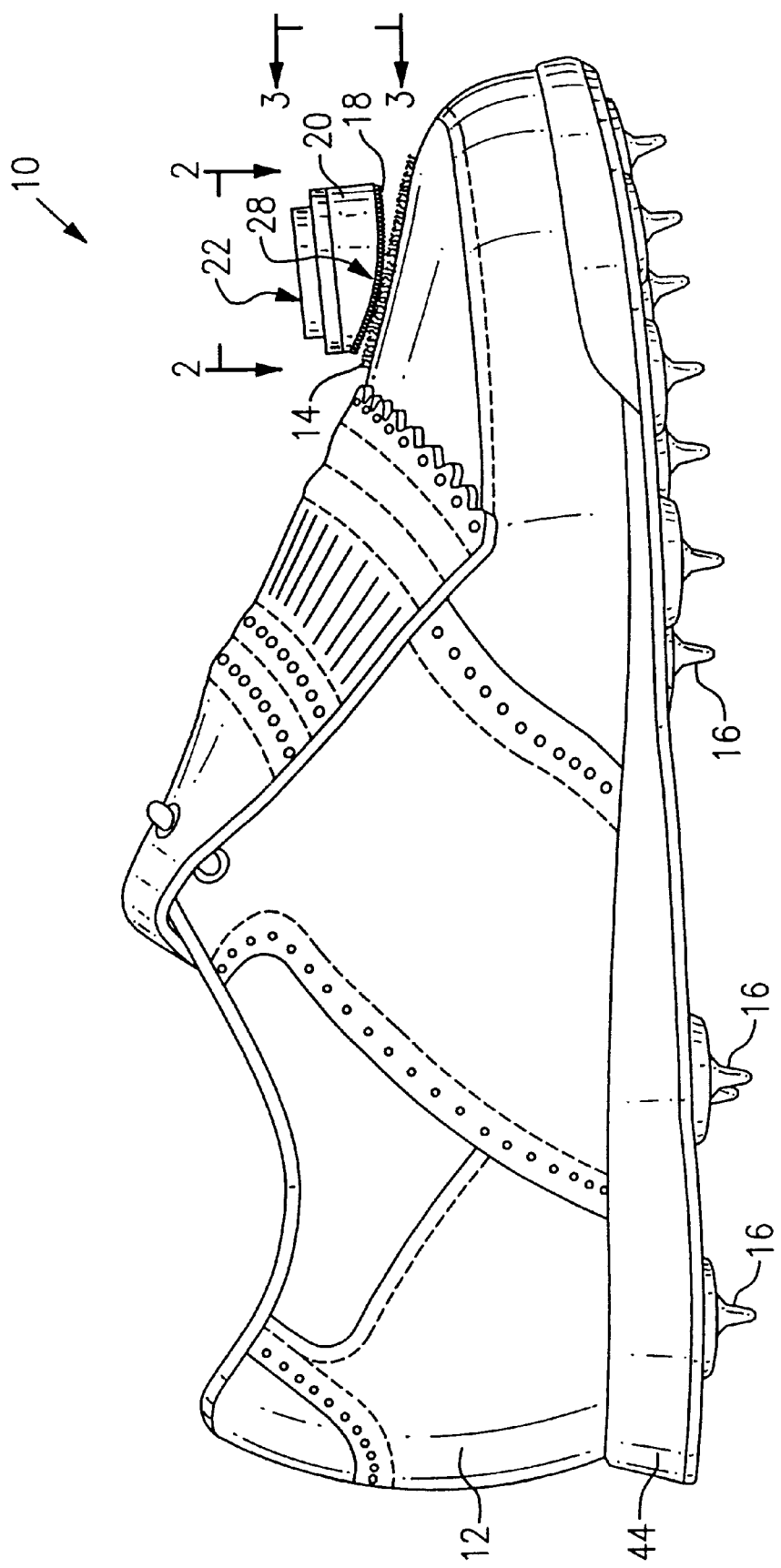
FIG. 1 is a shoe with level and method for determining grade.

Referring to all of the drawings and in particular to FIG. 1 is shown, a shoe with level and method for determining grade, identified in general by the reference numeral 10.

A shoe 12 includes a first half of a hook and loop fastener 14 attached to an upper surface thereof. Such types of fasteners are commonly sold under the tradename of VEL-CRO. The first half of a hook and loop fastener 14 may be either the hook or the loop portion, as desired.

The shoe 12 includes any type of footwear, including work or recreational types. The shoe 12, as shown, includes spikes 16 and is of the variety commonly used by a golfer (not shown).

A second half of a hook and loop fastener 18, which may include either the hook or the loop portion providing it is the opposite type as is used for the first half of a hook and loop fastener 14, is attached to the bottom of an arcuate base member 20.

The first half of a hook and loop fastener 14 is attached to the shoe 12 by an adhesive, by sewing, or by any other desired method. The second half of a hook and loop fastener 18 is attached to the base member 20 by an adhesive or by any other desired method.

A bubble level 22 includes a base 24 and a bubble portion 26. The base 24 of the bubble level 22 is attached to the top of the base member 20 at a location that is opposite with respect to where the second half of a hook and loop fastener 18 is attached. The bubble level 22 is attached to the base member 20 by the use of an adhesive or any other desired method.

The base member 20 includes a first arcuate portion 28 (FIG. 1) that includes a curvature that is generally in alignment with a longitudinal length (i.e., axis) of the shoe 12.

Figure 3:
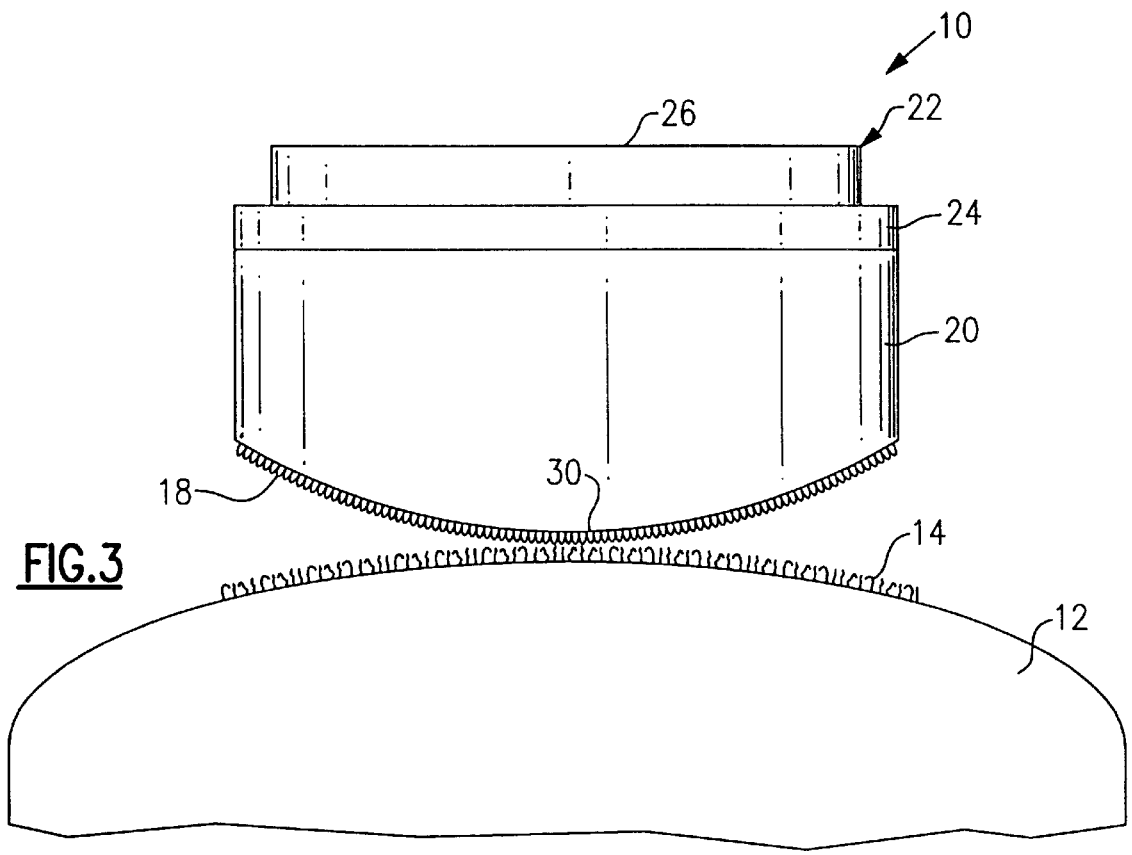
FIG. 3 is a is an enlarged view as shown in FIG. 1 as seen along the lines 3—3 therein.

The base member 20 includes a second arcuate portion 30 (FIG. 3) that includes a curvature that is generally perpendicular with respect to the longitudinal length of the shoe 12.

The combined effect provided by the first arcuate portion 28 and the second arcuate portion 30 is to provide a generally spherical shape for the bottom of the base member 20.

Adjustments made to the base member 20 (with respect to the shoe 12) about the first arcuate portion 28 and the second arcuate portion 30 are also considered as adjustments made about an "X" and a "Y" planar axis, respectively. Such types of adjustments in order to seek a level plane are well known in the leveling arts.

The second half of a hook and loop fastener 18 is attached to the base member 20 and conforms to the curvature of both the first arcuate portion 28 and also the second arcuate portion 30.

Figure 2:
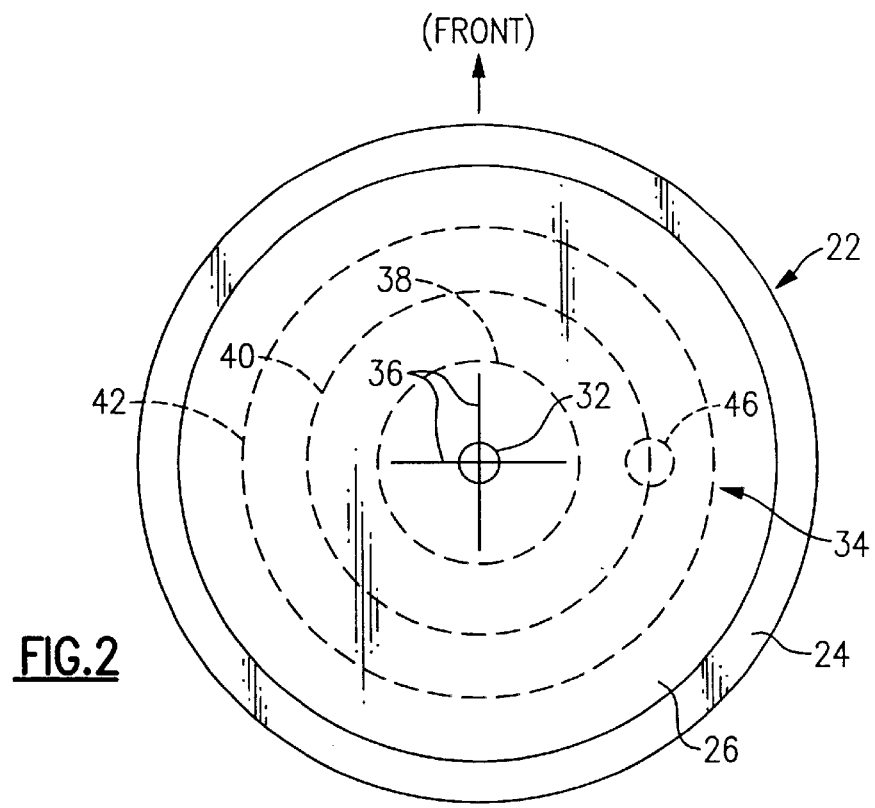
FIG. 2 is an enlarged view as shown in FIG. 1 as seen along the lines 2—2 therein.

Referring now primarily to FIG. 2, the bubble level 22 includes a bubble 32 that is typically formed of a gas (such as air) or of some other type of a fluid. The bubble 32 is always visible through a lens, identified in general by the reference numeral 34.

A center set of cross hairs 36 are attached to the lens 34 and are used to indicate a condition of true level. This occurs only after the bubble level 22 has been properly adjusted (i.e., calibrated), as is described in greater detail hereinafter. Assuming for a moment that calibration has already occurred, the following description will be easier to understand.

A plurality of first, second, and third gradation rings 38, 40, 42 respectively are shown in dashed concentric circles, and are used to indicate a proportional shift in any direction away from a level plane (as compared to when the bubble 32 is disposed under the cross hairs 36).

The first, second, and third gradation rings 38, 40, 42 indicate shifts in any preferred unit of measurement, such as degrees. The first gradation ring 38, if the bubble is disposed thereunder, may indicate a deviation from level of two degrees.

The second gradation ring 40, if the bubble is disposed thereunder, may indicate a further deviation that is four degrees in total magnitude away from level.

The third gradation ring 42, if the bubble is disposed thereunder, may indicate a yet further deviation that is six degrees in total magnitude away from level.

Any magnitude for any of the first, second, and third gradation rings 38, 40, 42 may, of course, be designed into the bubble level 22.

The lens 34 of the bubble level 22 is curved. Typically, the lens 34 includes a slightly convex shape when viewed from the outside whereby the center (i.e., where the cross hairs 36 are disposed) is slightly raised with respect to the outer circumference thereof.

The curvature is built into the lens 34 and is intended to properly align the bubble 32 with a plane of the base 24 of the bubble level 22.

The sensitivity of the bubble level 22 can be established by varying the shape of the lens 34 as well as by selecting a preferred viscosity for a fluid (not shown) that is disposed therein and which surrounds the actual bubble 32.

In use, the golfer stands on a known level surface, such as on a floor in a clubhouse (not shown) prior to using the shoe with level and method for determining grade 10. The golfer then looks down to view the location of the bubble 36 with respect to the cross hairs 36.

The objective is to ensure that when the golfer is standing on a known level surface, the bubble 32 then indicates a true level condition by being disposed under the cross hairs 36.

If the bubble 32 is disposed under the cross hairs 36, the device is ready for use. If the bubble 32 is disposed away from the cross hairs 36, the golfer simply grasps the base member 20 and pulls it with increasing force until the bubble level 22 (which is attached thereto) is urged apart from the shoe 12.

The golfer then tilts the base member 20 until the bubble 32 reads level (i.e., the bubble 32 is disposed under the cross hairs 36) and places the base member 20 back down upon the first half of a hook and loop fastener 14, ensuring that the second half of a hook and loop fastener 18 makes proper contact with the first half of a hook and loop fastener 14.

The golfer continues to look at the bubble 32 while this is being accomplished to ensure that it remains level after he releases his hold upon the base member 20.

If there is still any deviation apart from level remaining, the golfer pushes the base member 20 along one or both of the curvatures that are provided by the first arcuate portion 28 and by the second arcuate portion 30 with sufficient force to cause certain of the first and second halves of the hook and loop fastener 14, 18 to disengage and others to newly engage. This process is continued until the bubble 32 continues to read level after the golfer has relaxed the forces applied to the base member 20. This may take a little practice to become adept at accomplishing.

Accordingly, a method is provided whereby the base member 20, the second half of the hook and loop fastener 18, and the bubble level 22 may be readily detached apart from the shoe 12 and the first half of the hook and loop fastener 14 when desired and can be readily attached thereto when desired.

A method of calibrating the bubble level 22 with the shoe 12 is provided that compensates for any wear, or continuing wear that a sole 44 of the shoe 12 may experience as well as any tendency on the part of the golfer to stand at an offset apart from level.

Certain people tend to twist their foot while it is disposed in the shoe 12 so that the shoe 12 is skewed. The method described above compensates fully for any such tendency.

The described calibration methods ensure that the bubble level 22 is able to be adjusted along the "X" and the "Y" axes so that the bubble 36 reads level when the shoe 12 is disposed on a level surface.

Once the bubble 36 has been calibrated, the golfer is able to determine the grade at a green (not shown or other location) by walking from the "lay" of a golf ball (not shown) to a cup (not shown) that the golfer wishes to hit the ball into.

The golfer may take a few long strides, checking the reading of the level 22 at each step, or if the golfer wishes, at every other step. The golfer is able to note how far off from level the grade is and in which direction it deviates at any desired location.

If an offset bubble 46 (shown as a dashed circle) were disposed to the right and directly under the second gradation ring 40, the golfer would know that his right side is higher than the left side and, according to the example magnitude provided hereinabove, that the slope is four degrees at this particular location. In other words the slope breaks to the left by a magnitude of four degrees at this location and if the golf ball were to pass over this location, it would tend to curve toward the left in proportion to the magnitude of the grade and the velocity it had as it passed that particular location.

As the golfer walks from the ball to the cup, the golfer is able to note the grade at each step taken. The golfer then averages the information and computes an ideal trajectory (and force) with which to strike the ball, having now gained the benefit of accurately knowing the variations in grade that exist.

If the shot is deemed exceedingly important or difficult, the golfer can shorten the stride that is taken in order to obtain many sampling points, for an even more accurate average grade. Conversely, if the shot is deemed relatively easy or not too difficult, fewer sampling points can be obtained by a lengthening of the stride or by taking fewer samplings along the way.

The shoe with level and method for determining grade 10 can be used with contractors shoes or boots as well and used to determine the grade of a floor in a building or of an outside area as well. Whenever there is a need to know the grade, either at a particular given location, or when an average is desired, the shoe with level and method for determining grade 10 may well be employed to provide an accurate and rapid indication.

Neither the golfer nor the contractor, for example, are required to carry a separate level nor are they required to place the level on the surface they are walking on from time to time because it is carried automatically on the shoe 12 and the reading is taken every time they take a step and, pausing for just a moment, glance down for a reading of the bubble 32.

A golfer can obtain this information without embarrassment or, for that matter, without even appearing to be doing so. When its use is not required, the bubble level 22 and base member 20 are readily detachable and can be carried as an accessory item apart from the shoe 12.

If desired, the shoe with level and method for determining grade 10 can be used on both the shoe 12 (either right or left) and also on a remaining other shoe (not shown). That way, each placement of each foot potentially provides an indication of grade level.

If desired, the shoe 12 could include the shoe with level and method for determining grade 10 having a fine indication of deviation (such as the two degrees per gradation line mentioned hereinabove) while the remaining other shoe could include a second shoe with level and method for determining grade (not shown) that has a course indication of deviation, such as five degrees per each gradation line. Together, both coarse and subtle changes in grade could be easily determined.

The shoe with level and method for determining grade 10 can be sold as an aftermarket item or it may be included with the shoe 12 at the time of manufacture.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A level adapted for use with a shoe, comprising:
   (a) a bubble level, said bubble level providing a level indication for a plane, said plane including a first direction and a second direction, said second direction being perpendicular with respect to said first direction; wherein said level is attached to the top of a base member and wherein said base member includes a bottom that is disposed at an opposite end with respect to said top and wherein said bottom of said base member includes a spherical shape and wherein an upper surface of the shoe includes the use of a first half of a hook and loop fastener that is attached to the shoe and wherein a second half of a hook and loop fastener is attached to said bottom of said base member and wherein said bottom of said base member includes a first arcuate portion that includes a first curvature that is generally in parallel longitudinal alignment with a longitudinal axis of the shoe and the bottom of said base member includes a second arcuate portion that includes a second curvature that is generally in perpendicular alignment with respect to the longitudinal axis of the shoe; and
   (b) means adapted for attaching said bubble level to the shoe and wherein said means adapted for attaching includes said second half of a hook and loop fastener that is attached to said bottom of said base member cooperating with said first half of a hook and loop fastener that is attached to said shoe;
and wherein said bubble level is adapted to pivot along said first curvature and to pivot simultaneously along said second curvature.

* * * * *